(12) United States Patent
Collet et al.

(10) Patent No.: US 7,593,326 B2
(45) Date of Patent: Sep. 22, 2009

(54) METHOD AND APPARATUS FOR MANAGING BANDWIDTH REQUIREMENTS FOR VIDEO ON DEMAND SERVICES

(75) Inventors: Jean-Luc Collet, La Gaude (FR); Francois-Xavier Drouet, La Gaude (FR); Stephane Charles Michel Marie Lebrun, Biot (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 11/442,071

(22) Filed: May 25, 2006

(65) Prior Publication Data

US 2007/0005792 A1    Jan. 4, 2007

(30) Foreign Application Priority Data

Jun. 29, 2005    (EP)    ................................. 05300527

(51) Int. Cl.
- *H04H 20/28*    (2008.01)
- *H04J 3/16*    (2006.01)
- *H04N 7/173*    (2006.01)
- *H06F 15/16*    (2006.01)

(52) U.S. Cl. ..................... 370/229; 370/390; 370/395.5; 370/408; 370/472; 370/487; 725/95; 725/88; 725/102; 709/231; 709/238

(58) Field of Classification Search ................ 370/229, 370/390–408, 472, 487; 725/88, 95, 102; 709/231, 238

See application file for complete search history.

(56) References Cited

U.S. PATENT DOCUMENTS

| | | | |
|---|---|---|---|
| 5,941,951 A * | 8/1999 | Day et al. | 709/233 |
| 6,272,127 B1 * | 8/2001 | Golden et al. | 370/352 |
| 6,308,328 B1 * | 10/2001 | Bowcutt et al. | 725/111 |
| 6,332,163 B1 * | 12/2001 | Bowman-Amuah | 709/231 |
| 6,452,924 B1 * | 9/2002 | Golden et al. | 370/352 |
| 6,543,053 B1 | 4/2003 | Li et al. | |
| 6,754,181 B1 * | 6/2004 | Elliott et al. | 370/252 |
| 6,987,728 B2 * | 1/2006 | Deshpande | 370/229 |

(Continued)

FOREIGN PATENT DOCUMENTS

GB    2 385 683 A    8/2003

(Continued)

*Primary Examiner*—Edan Orgad
*Assistant Examiner*—Venkatesh Haliyur
(74) *Attorney, Agent, or Firm*—Schmeiser, Olsen & Watts; William H. Steinberg

(57) ABSTRACT

A method for managing bandwidth for transmitting the content of a video to users requesting the content. The total time duration T of the video is divided into N consecutive sessions. A unicast or multicast connection in normal play mode may be created for each session only at discrete times separated by a time increment $\Delta T$ equal to T/N. An overall bandwidth B is established for transmitting the content of the video to the users. The overall bandwidth B is divided into a first part $B_1$ and a second part $B_2$. The first part $B_1$ is allocated to a normal play mode of the video during the N sessions such that $B_1 = N*R$, where R is the bit transmission rate of the video. The second part $B_2$ is allocated to unicast sessions dedicated to implementation of at least one non-normal streaming mode of the video.

20 Claims, 11 Drawing Sheets

U.S. PATENT DOCUMENTS

| | | |
|---|---|---|
| 6,996,129 B2 * | 2/2006 | Krause et al. ................ 370/487 |
| 7,096,037 B2 * | 8/2006 | Canova et al. ........... 455/556.1 |
| 2002/0078219 A1 | 6/2002 | Tate et al. |
| 2003/0037331 A1 | 2/2003 | Lee |
| 2003/0051251 A1 | 3/2003 | Sugimoto et al. |
| 2003/0093802 A1 | 5/2003 | Cho et al. |
| 2004/0132448 A1 * | 7/2004 | Torres et al. ................ 455/427 |
| 2004/0261094 A1 * | 12/2004 | Huslak et al. ................. 725/25 |
| 2005/0071882 A1 * | 3/2005 | Rodriguez et al. ............ 725/95 |
| 2005/0190794 A1 * | 9/2005 | Krause et al. ............... 370/485 |
| 2007/0005771 A1 * | 1/2007 | Collet et al. ................ 709/226 |

FOREIGN PATENT DOCUMENTS

| | | |
|---|---|---|
| JP | 2003250138 A | 9/2003 |
| WO | WO 99/63759 | 12/1999 |
| WO | WO 02/49360 A1 | 6/2002 |

* cited by examiner

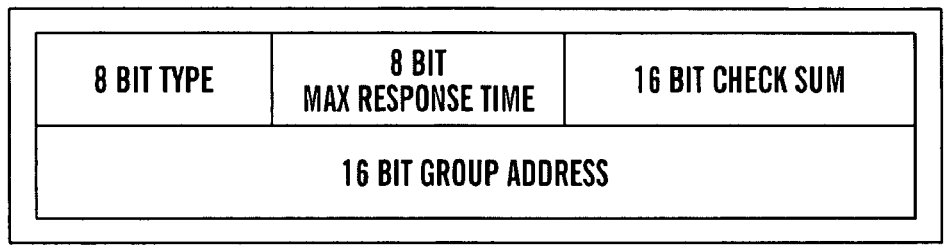

FIG. 2B

| Hex Value | Message | Description |
|---|---|---|
| 0x11 | Membership Query | These are used by the router to see whether any group members exist. Two types of membership query can be differentiated by the group address in the 32-bit group address field. A general query has a group address in the IGMP header of all zeros, and asks which groups have members on an attached network. A group-specifc query returns information on whether a particular group has members. |
| 0x16 | Version 2 Membership Report | When a host joins a multicast group, a membership report is sent to the router to inform the router that a system on the network is listening to multicast messages. |
| 0x17 | Leave Group | The last host of a multicast group inside a subnet must send a leave group message to all routers (224.0.0.2) when it leaves a group. A host may remember the hosts of the multicast group (received in membership reports in response to membership queries) so that it knows when it is the last one in the group, but this is not a requirement. If the group members are not remembered, every host leaving a group sends a leave group message. In any case a router checks if it was the last host in the group, and stops forwarding multicast messages if so. |
| 0x12 | Version 1 Membership Report | This report is used for compatibility reasons with IGMP v1. |

FIG. 2C

METHOD AND APPARATUS FOR MANAGING BANDWIDTH REQUIREMENTS FOR VIDEO ON DEMAND SERVICES

CROSS REFERENCE TO RELATED APPLICATIONS

This application is related to U.S. patent application Ser. No. 11/442,446 entitled "METHOD AND APPARATUS FOR WORKLOAD MANAGEMENT OF A CONTENT ON DEMAND SERVICE", filed on, and hereby incorporated by reference.

TECHNICAL FIELD

The present invention is directed to the field of Video on Demand (VOD), and more particularly to a method and system for managing bandwidth requirements for a VOD services.

RELATED ART

A TV over IP (TVoIP) service relies on a network Internet Protocol (IP) infrastructure and is generally based on three main components: head end equipment, middleware equipment, and end-user equipment.

The first component of head end equipment is the platform responsible for presenting the live content available to the user and may include managing the dynamic information coming from a broadcaster for an Electronic Programming Guide (EPG). The head end may also provide the administration services for the encoders/transcoders used to transmit the video streams to the users.

The second component of middleware equipment ensures the digital content delivery and provides the portal and services such as VOD, that could be installed closed to the Digital Subscriber Line Access Multiplexer (DSLAM). The DSLAM is the mechanism at a provider's central location that links many DSL connections to a single high-speed ATM (Asynchronous Transfer Mode). The user could use the middleware to provide certain video services.

The third component of end-user equipment includes the elements installed at the point at which the content is viewed by a user. This may include such elements as residential gateway (Modem), a Set Top Box (STB), an IP or Analogue phone and a PC. Video services may be provided in the STB or the PC or in some other way.

The combination of the three components, giving the possibility of Internet access, IP telephony and IP television, is called the "triple play" model and could be relevant in different environments such as mobile phones, PDAs and car embedded devices.

A broadcast system such as that described above is based on a multicast mechanism (one to many connections) and uses the IP Group Multicast Protocol RFC1112 to manage the user requests. Users requesting the streaming of the same Video are brought together to become members of a unique IP Multicast group (IPMG).

On the other hand a Video on Demand service is based on a unicast mechanism (one to one connection) and uses the present invention (see RFC 2326). When a user wants to view a video, a unicast peer to peer session is created between user equipment and a Video server. The means used to manage the interaction with the video such as "Pause", "Fast backward", "Fast forward" and "Play" is handled by the RTSP. A Unicast peer to peer session leads to a huge number of sessions which may be very expensive in terms of bandwidth and server charges but give greater user flexibility in terms of viewing capabilities and functions.

With respect to multicast broadcasts there are also some advantages and disadvantages. In a multicast session the users must all start the video streaming at the same time and the VCR functions described above (i.e. "Pause", "Fast backward", "Fast forward" and "Play) are no longer available.

Real Time Streaming Protocol (RTSP) is an Internet Engineering Task Force (IETF) proposed standard for controlling streaming media (see RFC 2326). It describes a set of messages that enable the efficient delivery of streamed multimedia over Internet Protocol (IP) networks.

RTSP works with established protocols, such as the Real Time Transport Protocol (RTP—see RFC 1889) and Hypertext Transfer Protocol (HTTP), to provide an integrated approach to streaming media over the Internet.

In VOD service, a user makes a request to a server to receive a media stream using VCR-style asset controls such as play, fast-forward, rewind and pause. To implement these actions, the server uses RTSP message pairs which consist of a user request and a server response. One user action can give rise to more than one Time streaming Protocol (TSP) message pair.

FIG. 1 shows the main types of message that may be used in the RTSP protocol.

A user requests a movie with the DESCRIBE and SETUP requests. The server responds with a DESCRIBE response and provides parameters related to the media, such as the audio header and duration. The SETUP message transmits transport parameters and establishes a session with a unique session ID. Once the movie is opened, the user can play it in normal, fast-forward, or rewind mode by sending a PLAY request with a Scale parameter that indicates the mode and speed. A PAUSE request may also be sent to pause the movie. Finally, a TEARDOWN request allows the user to exit from viewing the movie.

As previously indicated IP multicast provides an efficient one-to-many delivery service. To achieve such a delivery using IP unicast traffic, each datagram needs to be sent many times. To achieve one-to-many delivery using IP broadcast traffic, a single datagram is sent, but all nodes process it, even those that are not interested in it. Broadcast delivery service is unsuitable for inter-networks, as routers are designed to prevent the spread of broadcast traffic. With IP multicast, a single datagram is sent and forwarded across routers only to the network segments containing nodes that are interested in receiving it.

Historically, IP multicast traffic has been little utilized. However, recent developments in audio and video teleconferencing, distance learning, and data transfer to a large number of hosts have made IP multicast traffic more important.

The following describes the main details of IP multicast operations.

All multicast traffic is sent to a class D address in the range 224.0.0.0 through 239.255.255.255 (224.0.0.0/4). All traffic in the range 224.0.0.0 through 224.0.0.255 (224.0.0.0/24) is for the local subnet and is not forwarded by routers. Multicast-enabled routers forward multicast traffic in the range 224.0.1.0 through 239.255.255.255 with an appropriate Time to Live (TTL). A specific multicast address is called a group address.

The set of hosts that wish to receive multicast traffic at a specific group address is called a multicast group or host group. Multicast group members can receive traffic at their unicast address and the group address. Multicast groups can be permanent or transient. A permanent group is assigned a well-known group address. An example of a permanent group is the all-hosts multicast group, awaiting traffic on the well-known multicast address of 224.0.0.1. The membership of a permanent group is transient, only the group address is permanent.

There are no limits on the size of a multicast group. A host can send multicast traffic to the group address without belonging to the multicast group. There are no limits to how many multicast groups a host can belong to. There are no limits on when members of a multicast group can join and leave a multicast group. There are no limits on the location of multicast group members. IP multicast must be supported by the hosts and the routers of an IP inter-network.

IGMP is used by IP hosts to report group memberships to any neighboring routers that are multicast enabled. IGMP is implemented in the IP module as shown in FIG. 2A. IGMP messages are generally encapsulated in IP datagrams.

An IGMP v2 message consists of 64 bits, and contains the type of the message, a maximum response time (used only for membership queries), a checksum, and the group address as is shown in FIG. 2B.

The message types used for communication between a host and a router are defined by the first 8 bits of IGMP v2 message headers, and are shown in FIG. 2C.

WO 02/49360 A1 relates to a method and system for delivering media selections through a network. WO 02/49360 A1 discloses a media delivery system which features hybrid multicast-unicast streaming of media. This is achieved through the provision of distributed interactive servers which cache the multicast media streams generated by the media servers and buffers (in for example a STB) at the user stations (CS).

There is a considerable pay load required for this system which utilizes a huge amount of bandwidth. From the service provider point of view this has many disadvantages. The amount of bandwidth required gives rise to great resource requirements which are costly. The more bandwidth required by the customer/user the greater the cost to the service provider.

Also the provision of a system such as that described in WO/0249360 requires many elements such as the Distributed Interactive Servers, which add cost and complexity to the system.

There are also further bandwidth increases by virtue of how the WO/0249360 system makes use of high volume buffers at the CS 14. The buffer causes an increase in the amount of information transmitted as it is nearly always full. This is particularly so when the user is switching from a multicast to unicast and back again.

SUMMARY OF THE INVENTION

The present invention provides a method for managing bandwidth for transmitting the content of a video to one or more users requesting receipt of the content of the video, each user belonging to a user service class, said method comprising:

dividing the total time duration T of the video into N consecutive sessions $S_1, S_2, \ldots, S_N$, wherein N is at least 2, and wherein a unicast or multicast connection in normal play mode is permitted to be created for each session only at one of discrete times $T_0, T_1, \ldots, T_{N-1}$ subject to $T_i=i\Delta T$ and $\Delta T=T/N$ for $i=0, 1, \ldots, N-1$;

establishing an overall bandwidth B for transmitting the content of the video to the one or more users; and dividing the overall bandwidth B into a first bandwidth part $B_1$ and a second bandwidth part $B_2$ such that $B=B_1+B_2$, wherein the first bandwidth part $B_1$ is allocated to a normal play mode of the video during the N sessions such that $B_1=N*R$, wherein R is a bit transmission rate of the video, and wherein the second bandwidth part $B_2$ is allocated to unicast sessions dedicated to implementation of at least one non-normal streaming mode of the video.

The present invention provides a method for managing unicast and multicast connections to one or more users requesting receipt of the content of a video, each user belonging to a user service class, said method comprising:

receiving a first request from a first user of the one or more users to receive the content of the video;

after receiving the first request, ascertaining whether an entry for the video is included in a video table;

if said ascertaining ascertains that said entry for the video is not included in the video table, then adding the video to the video table, creating a request queue for storing requests to receive the content of the video, creating a user table to identify all users who have requested receiving the content of the video, and creating a multicast group table to identify all multicast groups receiving the content of the video, wherein the video table includes a request count that is created and initialized to zero in conjunction with said adding the video to the video table, and wherein the request count denotes the number of requests in the request queue for receiving the content of the video;

wherein if said ascertaining ascertains that said entry for the video is included in the video table, then the request queue, the user table, the multicast group table, and the request count had been created prior to said receiving the first request as a result of receiving a prior request from another user of the one or more users to receive the content of the video such that said entry for the video was not determined to be included in the video table when said prior request was received;

after said ascertaining, adding the first request to the request queue and incrementing the request count by 1.

The present invention provides a method and apparatus for managing the bandwidth of VOD services which overcomes at least one of the problems of known systems.

BRIEF DESCRIPTION OF THE DRAWINGS

FIG. 2B is a second IPMG message.

FIG. 2C is a table showing message types between a host and a router.

DETAILED DESCRIPTION OF THE INVENTION

Figure 1:
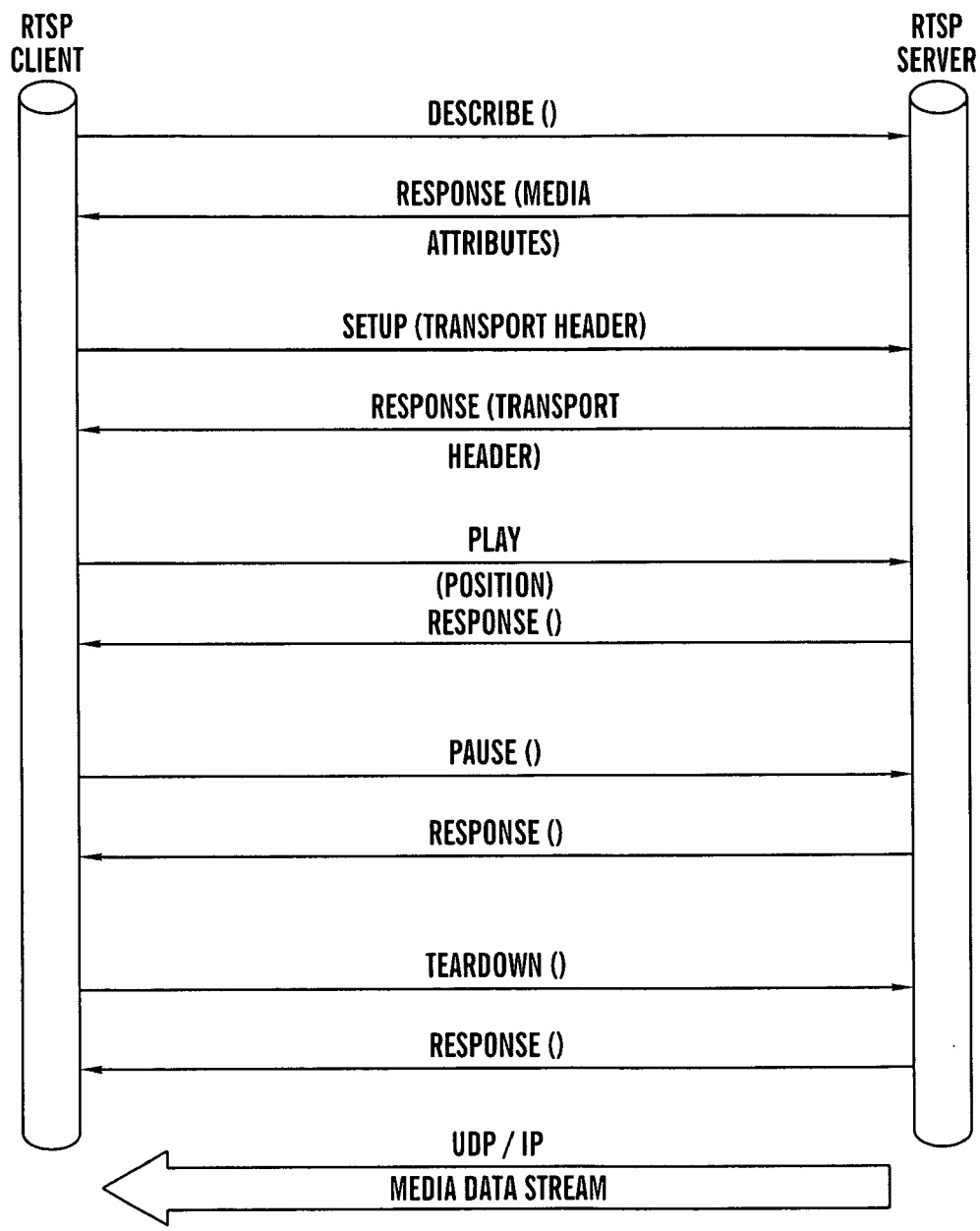
FIG. 1 is a diagram showing the main messages used in the Real Time Streaming Protocol (RTSP).
Figure 2A:
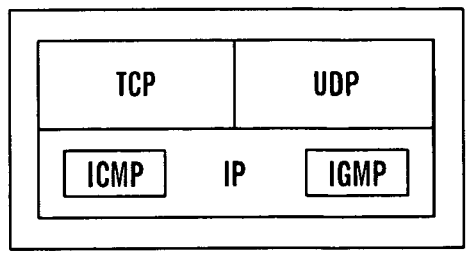
FIG. 2A is an example of an IP Multicast Group (IPMG) message encapsulated in a datagram.

In the description of the present invention herein, the words "user" and "client" have the same meaning.

The present invention provides a method to optimize and limit network bandwidth used in a Video on Demand (VOD) service provided to a significant number of customers simultaneously.

The present invention optimizes the bandwidth requirements of a VOD service while keeping the full functionalities offered by a protocol such as Real Time Streaming Protocol (RTSP).

The present invention provides a method of resynchronization after utilization of VCR like functions such as Fast Forward (FF) or Fast Backward (FB), without the necessity of using a resource consuming buffer such as a Set Top Box (STB) at the user end equipment.

The present invention provides a service of Video on Demand which has a dynamic management of bandwidth.

The present invention associates thresholds to the bandwidth reserved for VCR like functions (FF and FB), said thresholds being associated with a class of service.

The present invention is based on 2 types of video servers which may or may not be in the same location. Firstly, there is a unicast video server on which each user may establish a peer to peer connection. Secondly, there is a multicast video server which delivers video through a Multicast Group using either IGMP (Internet Group Multicast Protocol, RFC 1112) protocol or the Multicast feature of RTSP protocol. These two types of servers may be in different machines but are time synchronized using NTP (Network Time Protocol, RFC 1305).

The present invention is based on the fact that a streamed video is always started at discrete times sequenced according to a fixed time increment $\Delta T$. For example, if the chosen time boundary is the minute, the video requested by a user at time 20H 35M 28s will start at 20H 36M 00S. This is true for video delivered by both the unicast server and the multicast server.

Each user is connected to a session sessions no later than a latest connection time specific to each user, wherein the latest connection time for each user is one of said discrete times sequenced according to the fixed time increment $\Delta T$. The latest connection time for each user is determined by a maximum time delay for each user with respect to a time when each user requests receipt of the content of the video. The maximum time delay for each user is a function of the user service class that each user belongs to.

The present invention groups as many users as possible in the same multicast group instead of creating a peer to peer for each user, which reduces the overall bandwidth used to deliver the video. When a user requests a video stream, the request is put in a waiting list or queue associated with the requested video. The length of the time delay in the queue is dictated by the class of service of the user making the request. The requests pending in the queue are executed at a time boundary in accordance with the class of service limits. By delaying the request for video in accordance with the class of service, the maximum possible numbers of users requesting a VOD service will be joined to a multicast group.

If only one request is found in the queue, the user may be connected to the unicast server. If more than one request is found in the queue, an Internet Group Multicast is generally allocated, the video is started on this Multicast, and all users associated with the requests are connected to it. Commands such as Pause, Forward, Backward and Play may be used at any time by any user. If the user is in peer to peer, the normal RTSP protocol applies. In the case where the user belongs to an Internet Group Multicast, the Pause command removes the user from the Internet Group Multicast and the last received image is played in a loop. For VCR functions like Fast Forward and Fast Backward a unicast session (using RTSP protocol) is established with the unicast server.

Since the present invention minimizes the bandwidth usage, the number of simultaneous sessions available for VCR functions will be limited to a predefined threshold. Consequently a user requesting a Fast Forward or a Fast Backward will be put in a waiting queue if all VCR unicast sessions are in use. This means that the requested functions will be executed with a time delay, said time delay being dependant on the class of service and available bandwidth.

Figure 3:
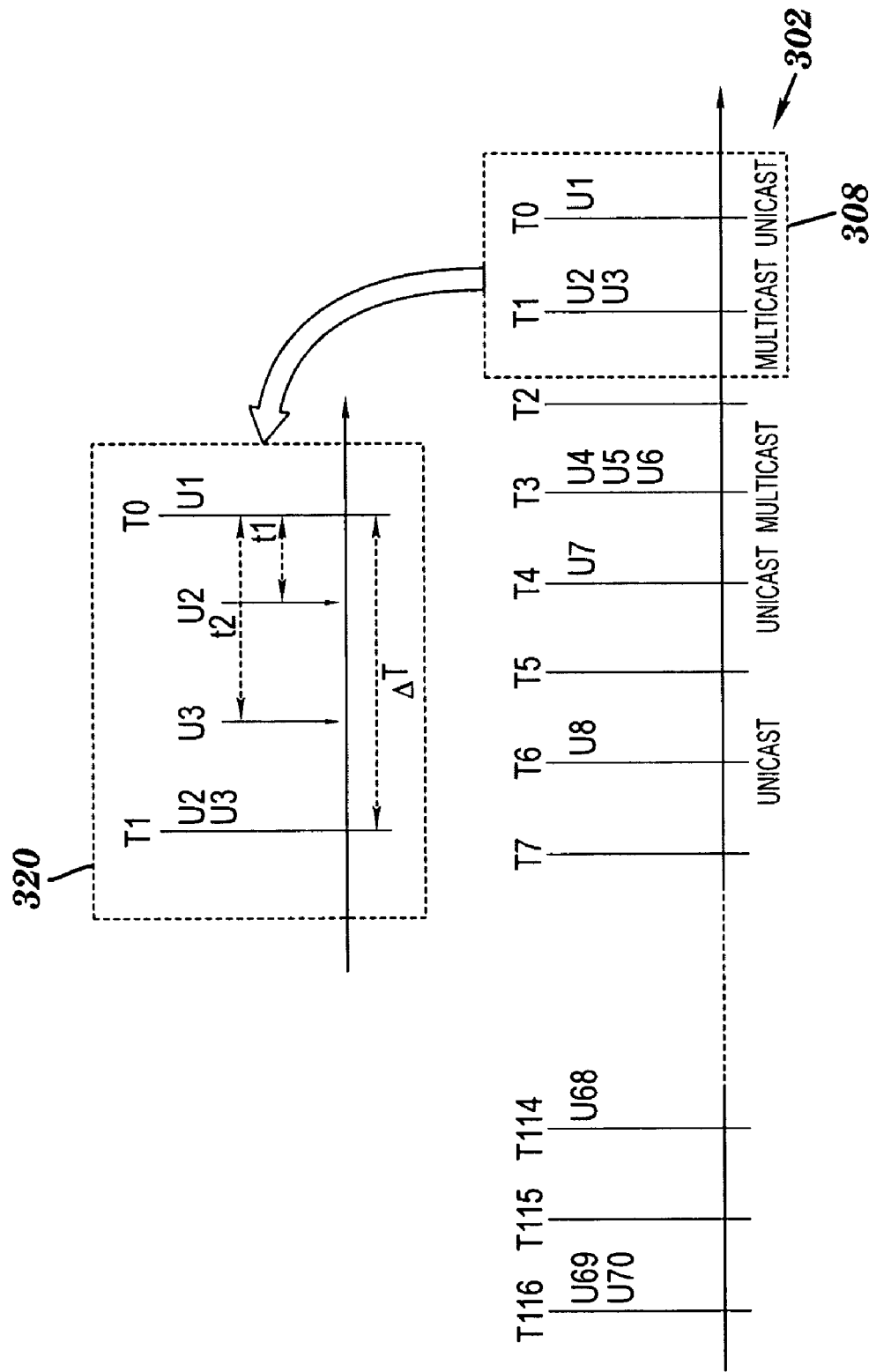
FIG. 3 is a diagram showing the streaming time slots for video streams with different configurations of time slot (unicast, multicast, unused) for different users, in accordance with embodiments of the present invention.

FIG. 3 is a diagram showing the streaming time slots for video streams with different configurations of time slot (unicast, multicast, unused) for different users, in accordance with embodiments of the present invention. At time T0 user U1 starts a video stream. As user U1 is the only user to request the video stream at time T0, the T0 streaming is started in unicast 302. A peer to peer connection is created between the user U1 and the video server. In this case, the protocol used is RTSP. At time T1, two users (U2 and U3) had requested a video stream in the same time slot (between times T0 and T1). The T1 stream is started as a multicast 308. An IP Group Multicast is created with users U2 and U3 as the members of the group. Between times T1 and T2, there is no user request to stream video, so no video streaming is allocated to time T2.

The zoomed section 320 on time slot T1 and T0 shows the request of video stream for user U2 and user U3. The request for user U2 starts at time T0+t1. Then the user U2 will wait time interval of T1−(T0+t1), or $\Delta T$−t1, before receiving the first image, while user U3 who starts at time T0+t2 will wait T1−(T0+t2) or $\Delta T$−t2.

A current value used in one embodiment for $\Delta T$ is 1 min, so the maximum waiting time will be 1 min and the average waiting time will be 30 seconds. According to various class of service, users may have longer maximum waiting times (e.g. 2*$\Delta T$, 3*$\Delta T$, . . . , n*$\Delta T$, etc.) to increase the probability of several users requesting the same video before a video stream is started. Consequently, all users waiting in the queue and having different classes of service are started at the same time as the user having the lowest waiting time.

Figure 4:
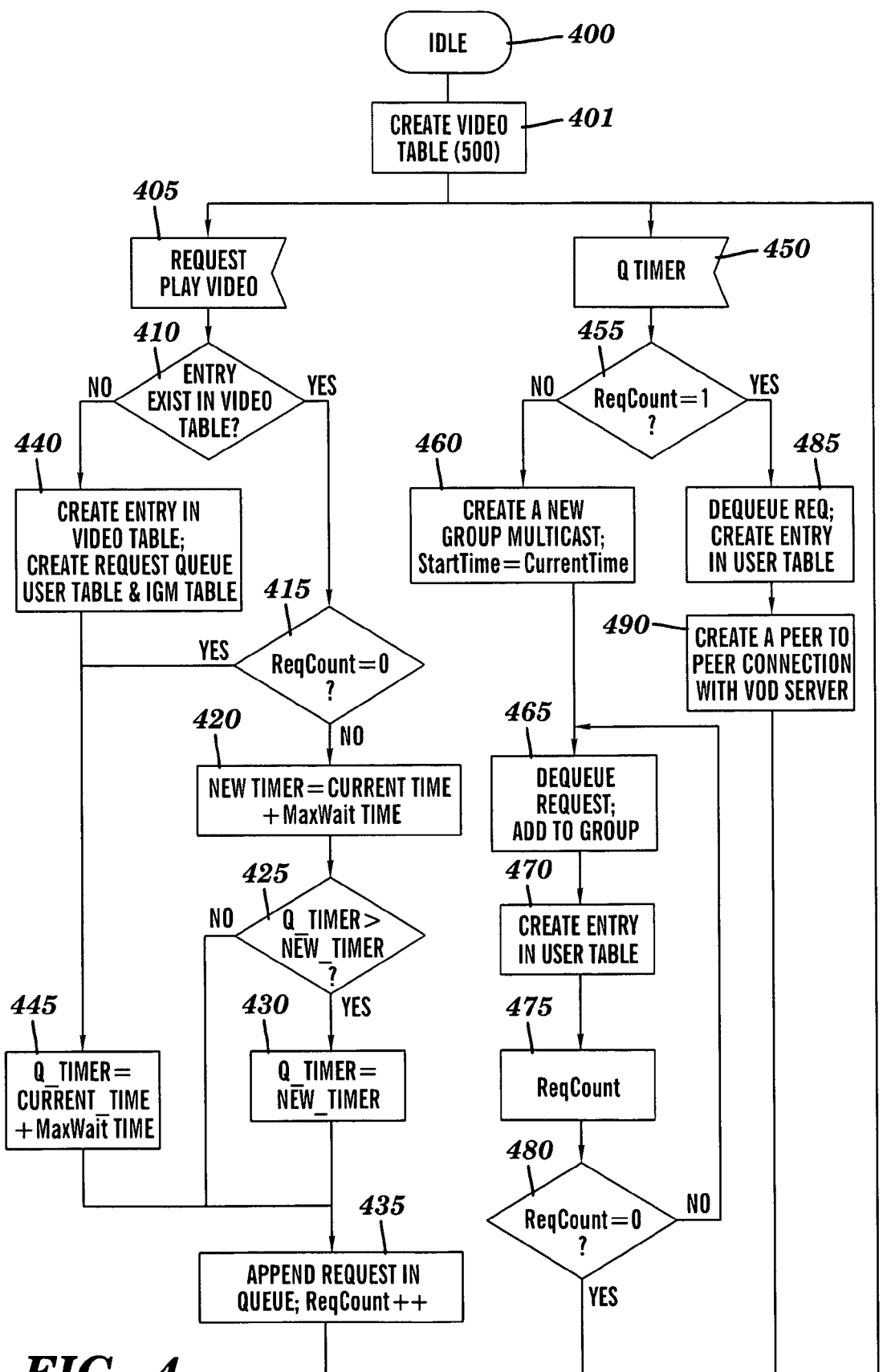
FIG. 4 is a flow chart showing a process to request and start a video stream, in conjunction with tables depicted in FIG. 5, in accordance with embodiments of the present invention.
Figure 5:
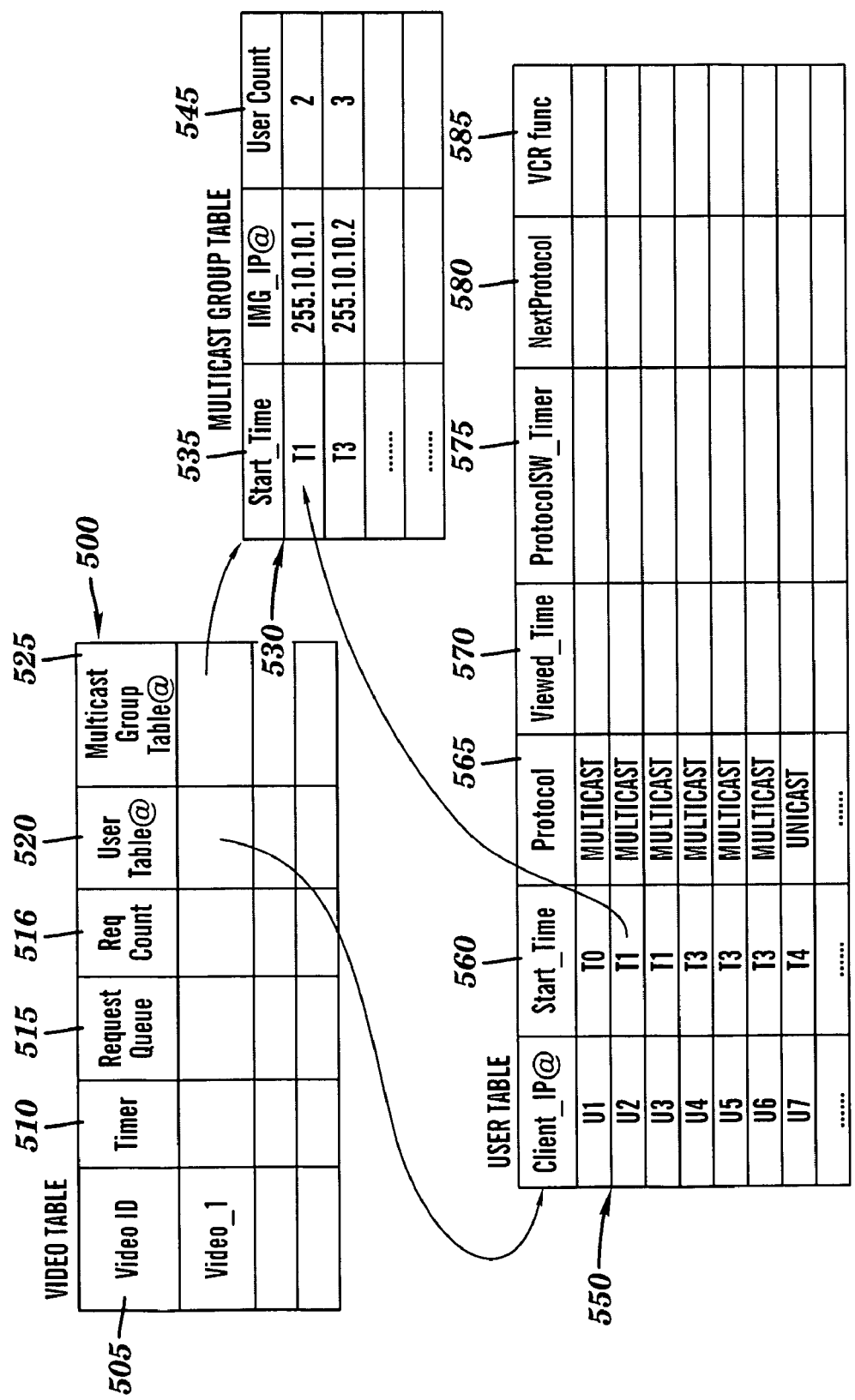

FIG. 4 is a flow chart showing a process to request and start a video stream, in conjunction with tables depicted in FIG. 5, in accordance with embodiments of the present invention.

After the system is started in step 400 of FIG. 4, step 401 creates a Video Table 500 with one entry per video title. In Video Table 500, the first column is the video identifier 505. For each entry or each video title, a User Table 550 and Multicast Group Table 530 are created. Their addresses are respectively copied in the column UserTable@ 520 and MulticastGroupTable@ 525. The columns called Timer 510, Request Queue 515 and Req Count 516 are used to handle the request and are not used once the users requesting a video stream are connected to the server.

At step 405 of FIG. 4, a request to play a video is received from a user. In step 410, the Video Table 500 is scanned in order to find an entry corresponding to the requested video.

If no entry is found in the Video Table 500 in step 410, step 440 creates a new entry, corresponding to the requested video, in the Video ID column 505 of the Video Table 500. At the same time an empty Request Queue 515 is created as well as the User Table 550 in order to register all users watching the requested video. The Multicast Group Table 530 is used to register all Multicast groups using said requested video.

Step 445 sets the Timer 510 to CurrentTime (rounded up to the next minute plus the Maximum waiting time in minutes).

Step 435 adds the request in the request queue and the Req Count 516 (which reflects the number of requests pending) is increased by 1. The added request contains at least the Video_Id and the user identification and generally the user IP address.

Next the process loops back to step 405 until the next event commences.

If at step 410 an entry has been found the Video Table 500, this means that one or several requests for this video are pending or have already been processed. Step 415 checks to verify if one or more request are pending (i.e., if ReqCount≠0).

If step 415 determines that there are no other requests pending (i.e., ReqCount=0), then the process executes steps 445 and 435 (as described supra) and then loops back to step 405 until the next event commences.

If step 415 determines that there are other requests pending (i.e., ReqCount≠0), then a Timer has thus already been set and step 420 computes a new timer value for this request according to the service class of the user.

Step 425 determines if the Timer already set is greater than the newly calculated timer value. If step 425 determines that the Timer already set is less than or equal to the newly calculated timer value, then the old timer is left unchanged and step 435 is next executed, followed by looping back to step 405 until the next event commences.

If step 425 determines that the Timer already set is greater than the newly calculated timer value, then step 430 sets the Timer to the newly computed timer value and step 435 is next executed, followed by looping back to step 405 until the next event commences.

At step 450 when the Timer expires (i.e., the amount of time denoted in Timer 510 of Video Table 500 has elapsed) the number of requests pending in the queue are removed. Step 455 determines whether only one request is pending (i.e., if ReqCount 515 of the Video Table 500 is equal to 1).

If step 455 determines there is only one request pending, then step 485 dequeues the request and: an entry is created in User Table 550 with the User IP address, the current time is set as Start_Time, and the protocol is set to RTSP. Then step 490 creates a peer to peer unicast connection between the User and the VOD server using RTSP protocol. Then the process loops back to step 405 until the next event occurs.

If step 455 determines there more than one request pending, then step 460 creates a new Internet Group Multicast and an entry for this group is created in Multicast Group Table 530 where a StartTime 535 (unique to the group) is set to current time in hours and minutes. Step 465 dequeues the first request which is added as membership to the newly created group. UserCount 545 of this entry in Multicast Group Table 530 is set to 1. Step 470 creates an entry in User Table 550 with the User IP address, the current time set as Start_Time and the protocol set to IGMP. Step 475 decrements ReqCount 516 of the Video Table 500 by one, wherein ReqCount is the number of request pending in the queue.

Step 480 determines whether no requests are pending (i.e., if ReqCount=0). If step 480 determines that there are some requests still pending in the queue (i.e., if ReqCount≠0), then the process loops back to step 465 to process another pending request. If step 480 determines that there are no requests are still pending in the queue (i.e., if ReqCount=0), then the process loops until the next event commences at step 405.

The main VCR functions for the user include "PAUSE", "FAST_BACKWARD", "FAST_FORWARD" and "PLAY". In one embodiment, it is assumed that all possible actions are starting from the state "PAUSED". However this need not always be the case.

When a user stops the video stream by pressing the "PAUSE" button on the remote control, two cases are possible.

In the first case, if the user is a member of an Internet Multicast Group, then the user is removed from the Multicast Group. If a video buffer exists in the equipment (Set Top Box), it is filled during time ΔT.

In the second case, if the user has a peer to peer connection, then a "Pause" command is sent to the VOD server to freeze the last image viewed on the user equipment.

Figure 6:
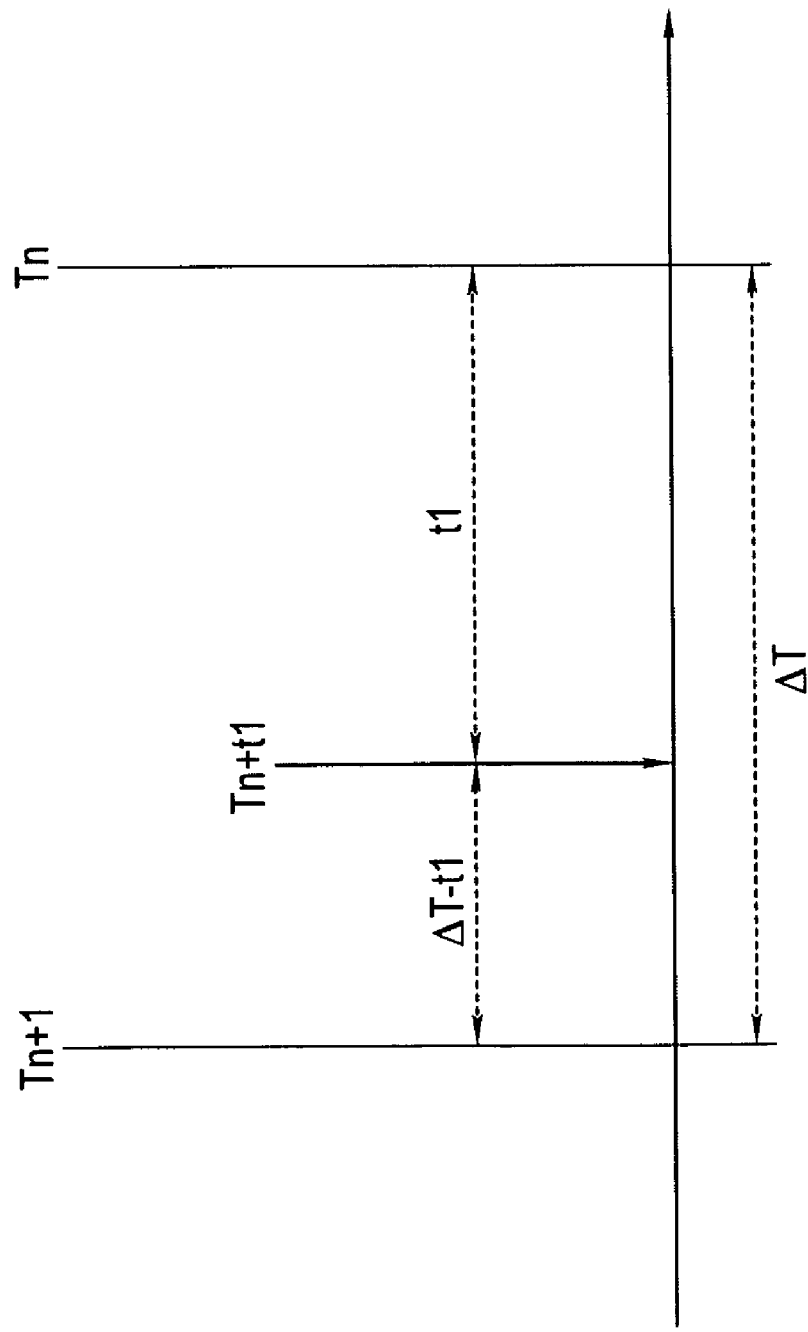
FIG. 6 is diagram illustrating different possibilities of resynchronization after VCR function, in accordance with embodiments of the present invention.

FIG. 6 is diagram illustrating different possibilities of resynchronization after VCR function, in accordance with embodiments of the present invention. When a user decides to restart a video, the restart time is generally not aligned on a time slot boundary. A user decides to restart playing a video at time Tn+t1, wherein i1 is the time interval between the time slot Tn and the time slot Tn+1. Thus the restart time Tn+t1 is delayed by t1 from the time slot Tn and in advance of the time slot Tn+1 by ΔT−t1.

The resynchronization of a time slot may be done in any appropriate manner whether it is required solely after a pause or if it occurs after other VCR functions have taken place. When the resynchronization occurs after a pause without VCR functions, it is necessary to resynchronize on the time slot later than the current time (i.e., at time Tn+1). If the STB has no video buffer, then "RESUME" or "PLAY" will start ΔT−t1 seconds after the request. If a video buffer exists in the STB, play starts immediately with the video saved in the buffer. The buffer is filled by the new time slot stream Tn+1 up to the position corresponding to ΔT−t1.

When the resynchronization occurs after a VCR functions at a time Tn+t1, it is necessary to wait ΔT−t1 to be resynchronized with the slot Tn+1. This may be acceptable if ΔT−t1 is relatively short. It may also catch up time (t1) to resynchronize with time slot Tn. This catch up may be accomplished by executing the RESUME or PLAY function with a time delay "t" which is t=t1/(n−1) such that "n" is the play out speed.

The decision to resynchronize on Tn or Tn+1 is determined by the minimum time between waiting and recapture time. The time for waiting (ΔT−t1) and time for recapture (t1/(n−1)) are equal if $$t1/(n-1) = \Delta T - t1 \text{ or}$$

$$t1 = \Delta T(n-1)/n$$

For a ΔT of 60 seconds, the time t for various values of n is: n=2 (30 seconds); n=4 (15 seconds); n=6 (10 seconds); n=5 (5.25 seconds);

Thus if ΔT−t1<t, then the last image is frozen and the video will restart in t seconds on time slot Tn+1. Otherwise if ΔT−t1=t, then the VCR function (e.g., Fast Forward) will continue for a time of ΔT(n−1)/n after the user has requested "RESUME" or "PLAY" to resynchronise the video with the next time slot Tn. This example is based on the fast forward function, but it is equally valid for the fast reverse or fast backward functions.

Figure 7:
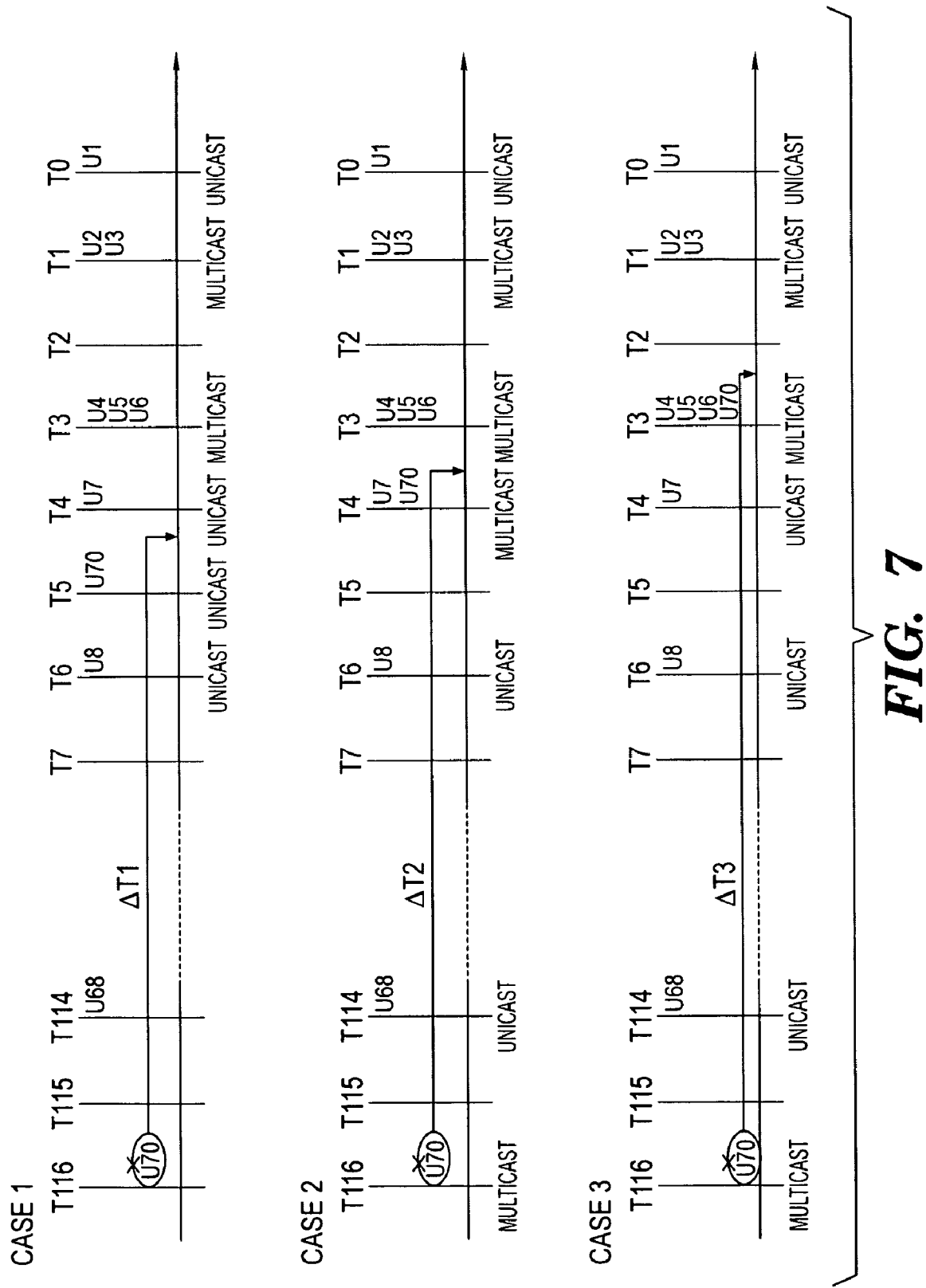
FIG. 7 is a diagram showing different cases for joining a streaming time slot, in accordance with embodiments of the present invention.

FIG. 7 is a diagram showing different cases for joining a streaming time slot, in accordance with embodiments of the present invention. It is assumed in the following example that the resynchronization is always done on the time slot that is the later of the two time slots $T^N$ and $T^{N+1}$, but the alternative is equally valid.

In Case 1, user U70 leaves the Multicast Group T116 and decides to restart the video stream between the time slot T4 and T5. T4 is currently playing a video in advance of that being watched by the user U70, so user U70 may be aligned on time slot T5. As no user is connected to slot T5, user U70 may establish a peer to peer unicast connection with the VOD server.

In Case 2, user U70 leaves the Multicast Group T116 and decides to restart the video stream between the time slot T3 and T4. T3 is currently playing a video in advance of that being watched by the user U70, so user U70 may be aligned on time slot T4. As the user U7 is already connected to slot T4 in unicast mode, the slot T4 is converted to a multicast mode and users U7 and U70 are added as members of the new multicast group associated to time slot T4.

In case 3, User 70 leaves the Multicast Group T116 and decides to restart the video streaming between the time slot T2 and T3. T2 is currently playing a video in advance of that being watched by the user U70, so user U70 may be aligned on time slot T3. The time slot T3 is in multicast mode and has several users (U4, U5, U6) as members. Thus user U70 is added as a new member of this multicast group.

The following general notation applies to FIGS. 8, 9, 10, and 11.

"timeHHMMSS" expresses a time in Hours, Minutes and seconds.

"timeHHMM" expresses a time in Hours, Minutes (seconds are always set to "00").

"timeSS" is the time expressed in seconds modulo 60.

"StartTime" is the time when a video stream has been started at a time slot. StartTime is always at the start of a minute. The StartTime uniquely identifies a time slot.

"CurrentTime" is the time when an event occurs. If not specified, "CurrentTime" is equivalent to "CurrentTimeHHMMSS"; and "ViewedTime" is the elapsed time from the beginning of a video. The "ViewedTime" corresponds to CurrentTime—StartTime if no pause or VCR function has occurred since the beginning of the stream.

Figure 8:
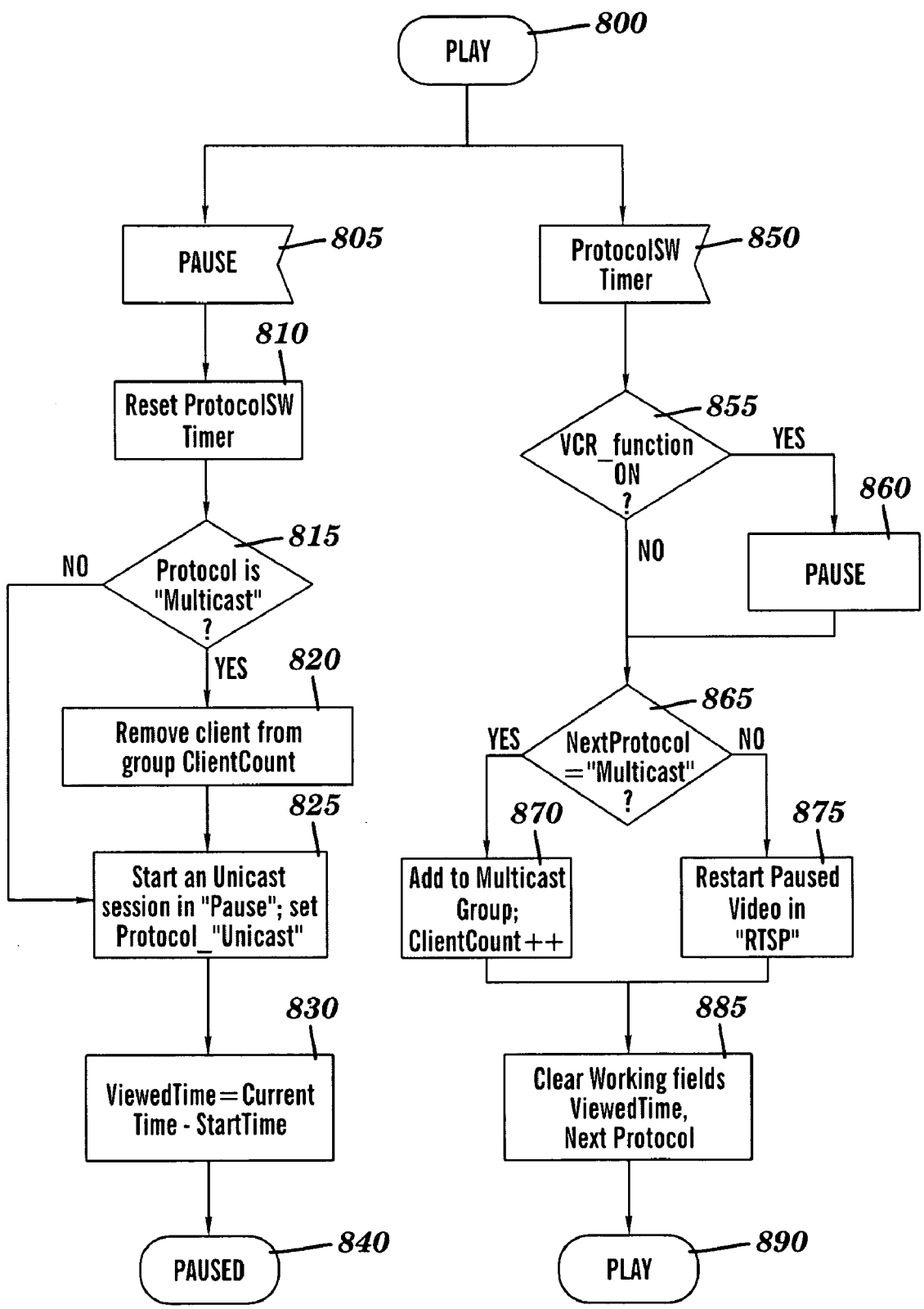
FIG. 8 is a flow chart depicting the Play status, in accordance with embodiments of the present invention.

FIG. 8 is a flow chart depicting the Play status, in accordance with embodiments of the present invention. The Play status exists when a video is being streamed or when a timer expiration is awaited to restart a video stream.

In Play state 800, a sequence steps is initiated either at step 805 (the video is streamed) or step 850 (the ProtocolSW Timer has expired).

If the video is streamed, a "Pause" at step 805 will interrupt the stream and freeze the last received image. Step 810 resets the protocolSW timer, although in streaming phase no protocolSW timer is actually running. Step 815 checks the field Protocol 565 of the User Table 550 to determine whether the user is in a multicast protocol.

If step 815 determines that the user is in a multicast protocol, then step 820 removes the user from the group and the user count associated with this multicast group is decremented by "1". Step 825 starts a unicast session in "Pause" and the protocol used by the user is set to unicast. Then step 830 is next executed.

If step 815 determines that the user is already in a unicast protocol and not in a multicast protocol, then step 825 is next executed and is followed by step 830.

Step 830 sets the ViewedTime 570 in User Table 550 with the elapsed time since the beginning of the video (ViewedTime=CurrentTime−StartTime). At this stage, the process goes into a "PAUSED" state 840.

If the ProtocolSW Timer has expired in step 850, this means that after a specific process a Paused video or a video in Fast Backward/Fast Forward has to be restarted (normal play).

Step 855 performs a check to determine if any VCR function (Fast Backward or Fast Forward) is running (i.e., if VCR_function is on). If step 855 determines that a VCR function is not running, then step 865 is next executed. If step 855 determines that a VCR function is running, then step 860 sends a "Pause" command to stop any active VCR function, followed by execution of step 865.

Step 865 determines if the protocol is a Multicast protocol. If step 865 determines if the protocol is a Multicast protocol, then step 870 adds the user to the multicast group identified by the StartTime 560 (in User Table 550) associated with this user and the User Count 545 (in Multicast Group Table 530) is incremented by 1, followed by execution of step 885. If step 865 determines if the protocol is not a Multicast protocol, then step 875 restarts the pushed video while keeping the user in unicast mode, followed by execution of step 885.

Step 885 clears the working fields of the User Table 550 (ViewedTime 570, NextProtocol 580, and VCR func 585) and the process goes into PLAY state 890.

Figure 9:
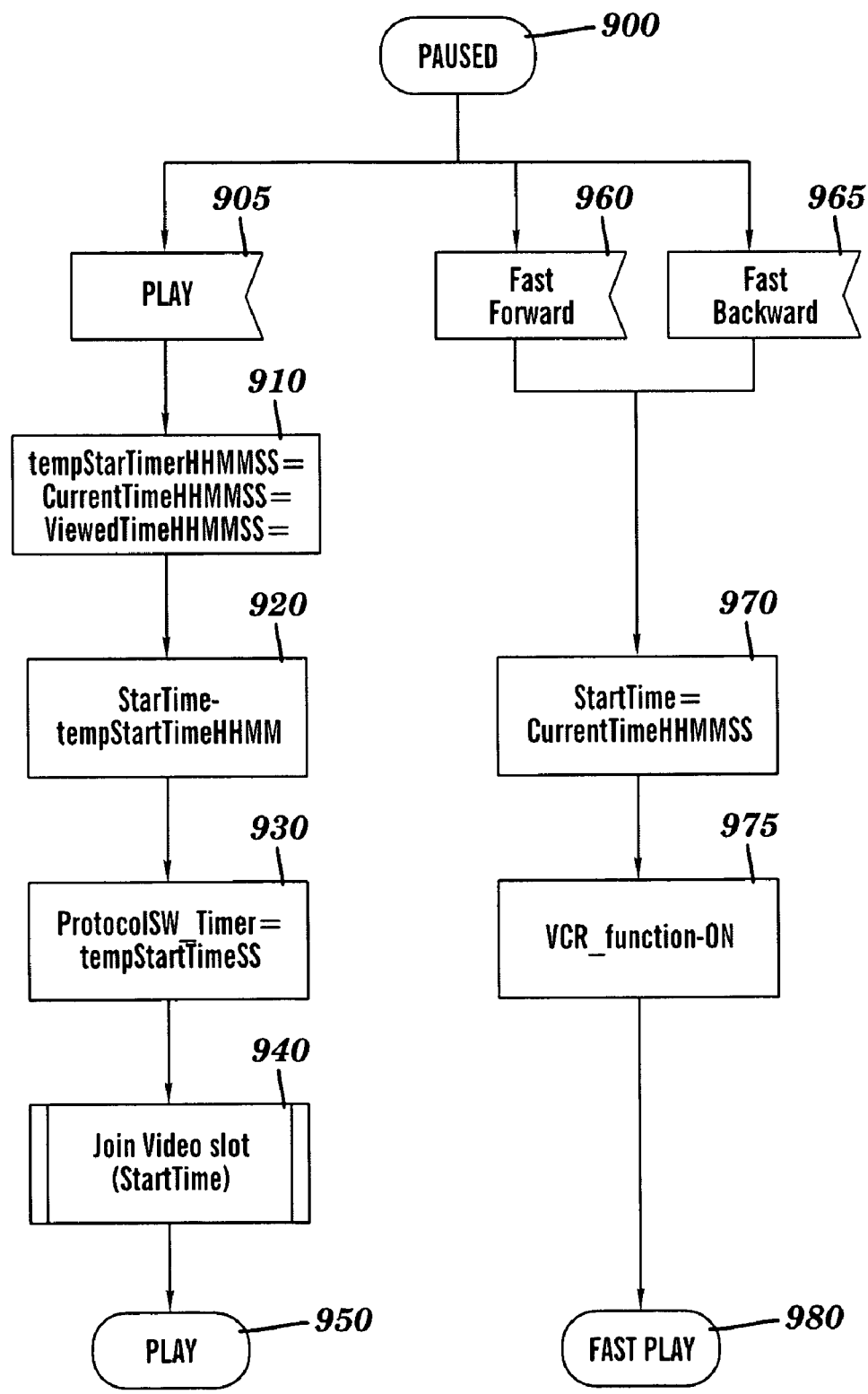
FIG. 9 is a flow chart depicting the Paused status, in accordance with embodiments of the present invention.

FIG. 9 is a flow chart depicting the Paused status, in accordance with embodiments of the present invention. In Paused state 900, only Play event (step 905) or VCR functions like Fast Forward (step 960) or Fast Backward event (step 965) may be received.

At step 905, a "Play" instruction is received.

Step 910 sets tempStarTimerHHMMSS, CurrentTmeHHMMSS, and ViewedTime.

In step 920, a temporary StartTime (New StartTime) is calculated and set in the corresponding entry of the User Table 550 by setting to "00" the seconds of tempStatTime. This allows the identification of the time slot from which the video will be streamed.

In step 930, ProtocolSW timer is set to a number of seconds corresponding to the tempStartTime modulo 60 which corresponds to the "SS" (seconds) part of tempStartTime.

In step 940, a procedure is commenced to identify or create the group to which the user will be attached. Then the process goes to the "Play" state 950 to wait the ProtocolSW timer expiration.

At step 960 Fast Forward has been received or at step 965 Fast Backward has been received. In step 970, CurrentTime expressed in Hours, minutes and seconds is saved and set in the corresponding entry of the User Table 550. In step 975, VCR function flag 585 is turned to "ON" and then the process goes into "FAST PLAY" state 980.

Figure 10:
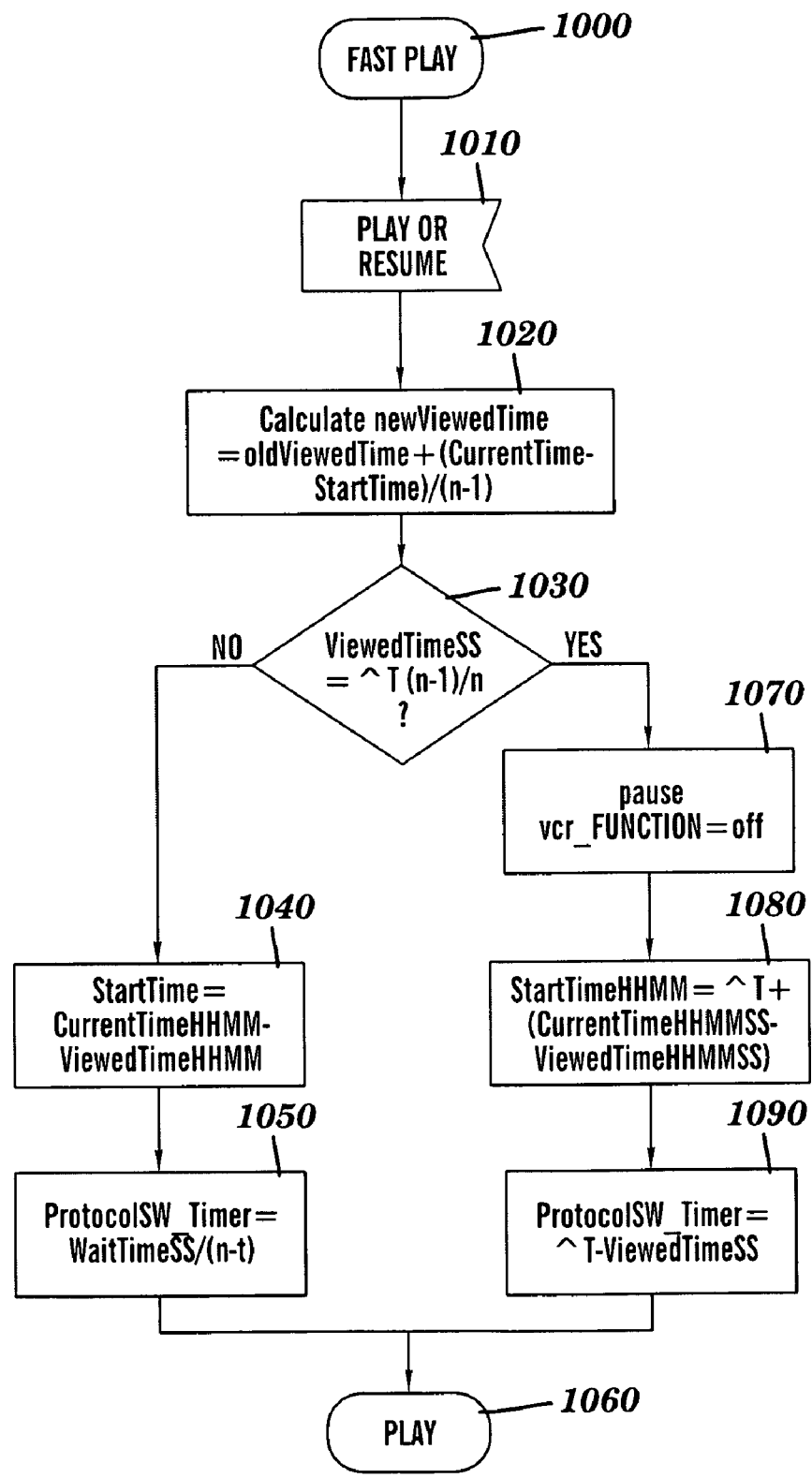
FIG. 10 is a flow chart depicting the FastPlay status, in accordance with embodiments of the present invention.

FIG. 10 is a flow chart depicting the FastPlay status, in accordance with embodiments of the present invention. FIG. 10 shows the FAST PLAY state 1000. Users are put in this FastPlay status either for a FAST_FORWARD or for a FAST_BACKWARD action. The only event valid in this state is "PLAY" or "RESUME" 1010.

Step 1020 calculates the viewed time and the result is put in the Viewed_Time field 570 of User Table 550. The new viewed time expressed in Hours, Minutes and Seconds is then calculated by adding:

(1) the old ViewTime (expressed in Hours, minutes and seconds); and (2) the difference between CurrentTime (expressed in Hours, minutes and seconds) and the VCR function StartTime (also expressed in Hours, minutes and seconds), this difference being multiply by "n−1" where "n" is the play out speed.

This new viewed time will be used later, to calculate the virtual start time of the video after resynchronization, when the PLAY function will be activated; i.e., New ViewedTime=Old ViewedTime+(CurrentTimeH-HMMSS−StartTime)(n−1)

At step 1030, the decision to wait until the next time slot or to recapture the time in advance on the previous time slot is taken. If 60 minus the new ViewedTimeSS (seconds) (which correspond to "t1" of FIG. 6) is less than $\Delta T(n-1)/n$ where "n" is the play out speed as mentioned above, it is necessary to wait the next time slot, followed by execution of step 1040 (StartTime=CurrentTimeHHMM−ViewedTimeHHMM) and step 1050 (ProtocolSW_Timer=WaitTimeSS/(n−t))", followed PLAY state 1060.

If $\Delta T-t1<\Delta T(n-1)/n$ in step 1030, then step 1070 issues a "pause" to the fast forward streamed video and the VCR func flag is turned off to indicate that no more VCR functions are active. At step 1080, the new StartTime is calculated by adding $\Delta T$ to the subtraction of CurrentTime HHMMSS from the ViewedTime HHMMSS. Then step 1090 sets the resulting value in the corresponding entry (ProtocolSW_Timer 575) of the User Table 550 with the seconds being set to "00" and the User is set in Status "PAUSED", followed by PLAY state 1060.

Figure 11:
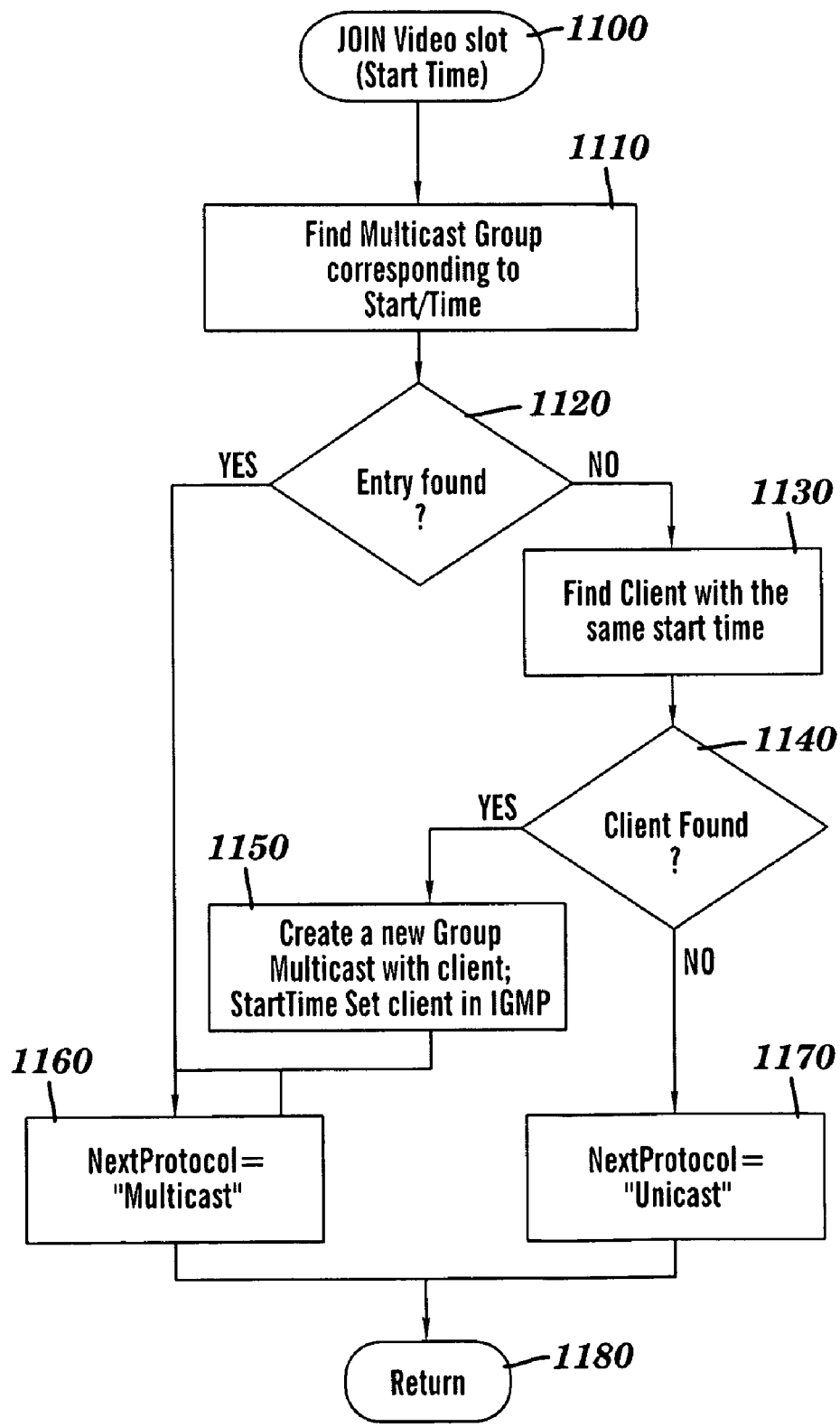
FIG. 11 is a flow chart depicting a procedure for joining a streaming video group, in accordance with embodiments of the present invention.

FIG. 11 is a flow chart depicting a procedure for joining a streaming video group, in accordance with embodiments of the present invention. Step 1100 initiates a user to join a time slot to which the video has streamed since the time specified by the value StartTime 560 in the User Table 550.

Step 1110 performs a lookup in the Multicast Group Table 530 to find an entry having the same StartTime 535 as that of the recalculated Start Time 560 for the current user. Step 1120 determines whether step 1110 has found an entry having the same StartTime 535 as that of the recalculated Start Time 560 for the current user.

If step 1120 determines that step 1110 has found an entry having the same recalculated Start Time 560 in the Multicast Group Table 530 for the current user, this means that a multicast group already exists and step 1160 sets the NextProtocol 580 in the User Table 550 to "multicast", followed by resuming the procedure and returning control to the server in step 1180.

If step 1120 determines that step 1110 has not found an entry having the same recalculated Start Time 560 in the Multicast Group Table 530 for the current user, then in step 1130 a lookup is timed out in the User Table 550 to find a user having the same StartTime. Step 1140 determines whether a user has been found in the User Table 550 with the same StartTime.

If step 1140 finds a user in the User Table 550 having the same StartTime, then in step 1150 a new multicast group is created with a StartTime corresponding to the specified user StartTime. The user is then moved into a newly created multicast group and the unicast session is abandoned. In step 1160, the NextProtocol 580 in User Table 550 for the current user is set to "multicast", followed by resuming the procedure and returning control to the server in step 1180.

If step 1140 does not find a user in the User Table 550 having the same StartTime, then in step 1170 NextProtocol 580 in Table 550 is set to "unicast", followed by resuming the procedure and returning control to the server in step 1180.

Overall bandwidth B allocated to VOD service for delivering the content of a specific video to one or more users is divided in two parts, namely a first bandwidth part $B_1$ and a second bandwidth part $B_2$ such that $B=B_1+B_2$. The first bandwidth part $B_1$ is allocated to normal play mode and represents a number N (wherein $N \geq 2$) of sessions, said N sessions being denoted as $S_1, S_2, \ldots, S_N$, wherein each session is either a multicast session or a unicast session as described supra.

The number (N) of sessions allocated to the first bandwidth part $B_1$ is the video duration T (e.g., in minutes) divided by the time between video slots or sessions, $\Delta T$, which may also be minutes. For example, for a video of 1 h30, the number of sessions (N) for a $\Delta T$ of 1 minute (60 seconds) is 90. Thus, the unicast or multicast connections pertaining to the N sessions are permitted to be created only at the discrete times $T_0, T_1, \ldots, T_{N-1}$ subject to $T_i=i\Delta T$ and $\Delta T=T/N$ for $i=0, 1, \ldots, N-1$.

The first bandwidth part $B_1$ is allocated to a normal play mode of the video during the N sessions such that $B_1=N*R$, wherein R is a bit transmission rate of the video Assuming that a MPEG2 video needs a bit rate of 3.5 Mbps, the bandwidth allocated to the first bandwidth part $B_1$ in the preceding example is 315 Mbps (i.e., N=90 and R=315 Mbps).

The second bandwidth part $B_2$ is allocated to unicast sessions used for VCR non-normal streaming modes such as Fast Forward and Fast Backward. As previously mentioned, if a user requests a fast Forward or a Fast Backward, the user will be put into a waiting queue, if all VCR unicast sessions are currently in use. This means that the requested functions of the VCR streaming mode will be executed within a specific time delay. Statistically this time delay will be very short as there are normally only 2% of users performing VCR functions at anyone time. Moreover, the mean duration of a Fast Forward or Fast Backward does not generally exceed 2 minutes.

The second part of bandwidth may have several thresholds associated to different classes of services. In one embodiment, three class of services are defined (Bronze, Silver, and Gold). The classes of service (Bronze, Silver, Gold) have thresholds associated therewith and give rise to different level of services and Service Level Agreements for each class, which reduces the overall amount of bandwidth. The threshold allocated to Bronze user will be the lowest, meaning that the Bronze user have statistically more chance to be delayed before execution of a Fast Forward or Fast Backward request. The silver threshold is higher than the bronze threshold but lower than the Gold threshold. The value allocated to the different thresholds is determined according to the available bandwidth and to the overall usage of VCR functions.

The following gives examples of constraints for each class of service.

Bronze: Streaming of video starts within 5 minutes, with high probability of VCR functions delayed.

Silver: Streaming of video starts within 2 minutes, with low probability of VCR functions delayed Gold: Streaming of video starts within 1 minute, with very low probability of VCR functions delayed.

Each class of service may cost more or less than the others and it is in this way that the video provider has more scope for managing the service being provided within the bandwidth limits which are required.

Thus by dividing the overall bandwidth B into the first bandwidth part $B_1$ and the second bandwidth part $B_2$ as described supra, the overall bandwidth B is more controllable by the service provider.

The present invention provides a computer program comprising instructions for implementing the methods described herein via execution of the instructions on a computer system comprising a computer. The computer system also comprises the computer program. The computer program is stored on a computer readable storage medium of the computer.

While the invention has been particularly shown and described with reference to a particular embodiments, it will be understood that various changes in form and detail may be made therein without departing from the spirit and scope of the invention.

What is claimed is:

1. A method for managing bandwidth for transmitting the content of a video to one or more users requesting receipt of the content of the video, each user belonging to a user service class, said method comprising:
   a computer dividing the total time duration T of the video into N consecutive sessions $S_1, S_2, \ldots, S_N$, wherein N is at least 2, and wherein a unicast or multicast connection in normal play mode is permitted to be created for each session only at one of discrete times $T_0, T_1, \ldots, T_{N-1}$ subject to $T_i = i\Delta T$ and $\Delta T = T/N$ for $i = 0, 1, \ldots, N-1$;
   said computer establishing an overall bandwidth B for transmitting the content of the video to the one or more users; and
   said computer dividing the overall bandwidth B into a first bandwidth part $B_1$ and a second bandwidth part $B_2$ such that $B = B_1 + B_2$, wherein the first bandwidth part $B_1$ is allocated to a normal play mode of the video during the N sessions such that $B_1 = N*R$, wherein R is a bit transmission rate of the video, and wherein the second bandwidth part $B_2$ is allocated to unicast sessions dedicated to implementation of at least one non-normal streaming mode of the video.

2. The method of claim 1, wherein the method further comprises:
   connecting each user of the one or more users to a session of the N sessions no later than a latest connection time specific to each user, wherein the latest connection time for each user is one of said discrete times $T_0, T_1, \ldots, T_{N-1}$ and is determined by a maximum time delay for each user with respect to a time when each user requests receipt of the content of the video, and wherein the maximum time delay for each user is a function of the user service class that each user belongs to.

3. The method of claim 2, where the method comprises:
   receiving a request at a first time from a first user for receipt of the content of the video, wherein no request for the content of the video is received from any other user such that the latest connection time for said any other user is at least the first time and no later than the latest connection time for the first user; and
   creating a unicast connection, at the latest connection time for the first user, for receipt by the first user of the content of the video in normal play mode.

4. The method of claim 2, wherein the method comprises:
   receiving a request at a first time from a first user for receipt of the content of the video;
   receiving a request at a second time from a second user for receipt of the content of the video, wherein the latest connection time for the first user is later than the first time and the second time, wherein the latest connection time for the second user is later than the first time and the second time, and wherein the latest connection time for the second user is later than the latest connection time of the first user; and
   creating a multicast group comprising the first user and the second user; and
   creating a multicast connection at the latest connection time of the first user for receipt by the users in the multicast group of the content of the video in normal play mode.

5. The method of claim 4, wherein the user service class that the first user belongs to and the user service class that the second user belongs to are not a same user service class, and wherein the maximum time delay for the second user is greater than the maximum time delay for the first user.

6. The method of claim 2, where the method comprises:
   receiving a first request at a first time from a user for receipt of the content of the video;
   creating a connection at a connection creation time for receipt by the user of the content of the video in normal play mode, wherein the connection creation time is no later than the latest connection time for the user;
   receiving a second request at a second time from the user for implementing a non-play mode of the content of the video, wherein the second time is later than the connection creation time;
   responsive to the second request, disconnecting the user from the connection created at the connection creation time and implementing the non-play mode of the content of the video in accordance with the second request;
   after said implementing the non-play mode of the content of the video, receiving a third request at a third time from the user to resynchronize with the content of the video;
   responsive to the third request, resynchronizing the user with the content of the video.

7. The method of claim 6, wherein the third time is between the $T_n$ and $T_{n+1}$, wherein said discrete times comprise $T_n$ and $T_{n+1}$, wherein said resynchronizing occurs at discrete time $T_n$ if a recapture time between $T_n$ and the third time is less than a waiting time between the third time and $T_{n+1}$, and wherein said resynchronizing occurs at discrete time $T_{n+1}$ if the recapture time is not less than the waiting time.

8. The method of claim 1, wherein the at least one non-normal streaming mode comprises a fast backward mode and a fast forward mode.

9. A computer program comprising instructions for implementing the method of claim 1 via execution of the instructions on a computer system comprising said computer, said computer program stored on a computer readable storage medium.

10. A system comprising a computing device and a computer program, said computer program comprising instructions for implementing the method of claim 1 via execution of the instructions on the computing device, said computing device consisting of said computer, said computer program stored on a computer readable storage medium,.

11. A method for managing unicast and multicast connections to one or more users requesting receipt of the content of a video, each user belonging to a user service class, said method comprising:
   a computer receiving a first request from a first user of the one or more users to receive the content of the video;
   after receiving the first request, said computer ascertaining whether an entry for the video is included in a video table;
   if said ascertaining ascertains that said entry for the video is not included in the video table, then said computer adding the video to the video table, creating a request queue for storing requests to receive the content of the video, creating a user table to identify all users who have requested receiving the content of the video, and creating a multicast group table to identify all multicast groups receiving the content of the video, wherein the video table includes a request count that is created and initialized to zero in conjunction with said adding the video to the video table, and wherein the request count denotes the number of requests in the request queue for receiving the content of the video;

wherein if said ascertaining ascertains that said entry for the video is included in the video table, then the request queue, the user table, the multicast group table, and the request count had been created prior to said receiving the first request as a result of receiving a prior request from another user of the one or more users to receive the content of the video such that said entry for the video was not determined to be included in the video table when said prior request was received;

after said ascertaining, said computer adding the first request to the request queue and incrementing the request count by 1.

12. The method of claim 11, wherein if either said ascertaining ascertains that said entry for the video is not included in the video table or both said ascertaining ascertains that said entry for the video is included in the video table and the record count is equal to zero, then the method further comprises: setting a timer entry in the video table to a current time rounded up to the next minute plus a maximum time delay in minutes such that the maximum time delay is a function of the user service class that the first user belongs to;

wherein if said ascertaining ascertains that said entry for the video is included in the video table and the request count is greater than zero, then the method further comprises: computing a new timer value as equal to a current time rounded up to the next minute plus the maximum time delay in minutes such that the maximum time delay is the function of the user service class that the first user belongs to, and if the new timer value is greater than the timer entry in the video table then replacing the timer entry in the video table with the new timer value.

13. The method of claim 12, wherein said ascertaining ascertains that said entry for the video is not included in the video table.

14. The method of claim 12, wherein said ascertaining ascertains that said entry for the video is included in the video table.

15. The method of claim 12, wherein upon elapse of the time denoted by the timer entry in the video table the method further comprises:

determining whether the request count is equal to 1;

if said determining whether the request count is equal to 1 determines that the request count is equal to 1 which denotes that the request queue has exactly one request therein from a waiting user of the one or more users to receive the video content of the video, then: dequeueing the one request from the request queue, and creating a unicast connection with the waiting user with respect to the video;

if said determining whether the request count is equal to 1 determines that the request count is not equal to 1 but is instead equal to at least 2 which denotes requests in the request queue from corresponding users of the one or more users to receive the video content of the video, then: dequeueing the requests in the request queue, creating a new multicast group comprising the corresponding users, and creating a multicast connection with the new multicast group with respect to the video.

16. The method of claim 15, wherein said determining whether the request count is equal to 1 determines that the request count is equal to 1.

17. The method of claim 15, wherein said determining whether the request count is equal to 1 determines that the request count is not equal to 1 after which the method further comprises:

entering in the multicast group table for the new multicast group: the request count and a start time equal to a current time in hours and minutes; and entering in the user table for each user of the corresponding users: the current time in hours and minutes, an Internet Protocol (IP) address of said each user, and a protocol indication of Multicast for said each user.

18. The method of claim 11, wherein the method further comprises including in the video table an address of the user table and an address of the multicast group table.

19. A computer program comprising instructions for implementing the method of claim 11 via execution of the instructions on a computer system comprising said computer.

20. A system comprising a computing device and a computer program, said computer program comprising instructions for implementing the method of claim 11 via execution of the instructions on the computing device, said computing device consisting of said computer, said computer program stored on a computer readable storage medium.

* * * * *